(12) United States Patent
Sohn et al.

(10) Patent No.: US 9,157,026 B2
(45) Date of Patent: Oct. 13, 2015

(54) PHOTOLUMINESCENT SHEET

(75) Inventors: Choong-Yong Sohn, Chungcheongbuk-do (KR); Young-Wook Ko, Daejeon (KR)

(73) Assignee: LG INNOTEK CO., LTD., Seoul (KR)

( * ) Notice: Subject to any disclaimer, the term of this patent is extended or adjusted under 35 U.S.C. 154(b) by 313 days.

(21) Appl. No.: 12/897,415

(22) Filed: Oct. 4, 2010

(65) Prior Publication Data

US 2011/0020607 A1 Jan. 27, 2011

Related U.S. Application Data

(63) Continuation of application No. 11/716,908, filed on Mar. 12, 2007, now Pat. No. 7,829,179.

(30) Foreign Application Priority Data

Mar. 10, 2006 (KR) .................. 10-2006-0022575

(51) Int. Cl.
| | |
|---|---|
| B32B 27/20 | (2006.01) |
| B32B 3/30 | (2006.01) |
| B32B 3/14 | (2006.01) |
| C09K 11/77 | (2006.01) |
| B32B 3/08 | (2006.01) |
| B32B 3/26 | (2006.01) |
| B32B 7/12 | (2006.01) |

(Continued)

(52) U.S. Cl.
CPC ............. *C09K 11/7761* (2013.01); *B32B 3/085* (2013.01); *B32B 3/263* (2013.01); *B32B 3/30* (2013.01); *B32B 5/16* (2013.01); *B32B 7/12* (2013.01); *C09K 11/02* (2013.01); *C09K 11/7731* (2013.01); *C09K 11/7734* (2013.01); *C09K 11/7774* (2013.01); *Y10T 428/24579* (2015.01); *Y10T 428/24752* (2015.01); *Y10T 428/24802* (2015.01)

(58) Field of Classification Search
CPC ............... C09K 11/02; C09K 11/7731; C09K 11/7734; C09K 11/7761; C09K 11/7774; Y10T 428/24579; Y10T 428/24752; Y10T 428/24802

See application file for complete search history.

(56) References Cited

U.S. PATENT DOCUMENTS

| | | | |
|---|---|---|---|
| 4,217,380 | A | 8/1980 | Medica et al. |
| 4,242,372 | A | 12/1980 | Kobale et al. |
| 5,883,684 | A | 3/1999 | Millikan et al. |

(Continued)

FOREIGN PATENT DOCUMENTS

| | | | |
|---|---|---|---|
| EP | 1662277 A1 | * | 5/2006 |
| JP | 07-174909 A | | 7/1995 |

(Continued)

*Primary Examiner* — Gerard Higgins
*Assistant Examiner* — Sathavaram I Reddy
(74) *Attorney, Agent, or Firm* — Saliwanchik, Lloyd & Eisenschenk

(57) ABSTRACT

A photoluminescent sheet is disclosed. In one embodiment, the photoluminescent sheet has a phosphor, absorbs some light, of at least one wavelength, of light emitted from a light source, emits particular light of a wavelength different from the wavelength of the emitted light and allows the remaining of the light emitted from the light source to penetrates the photoluminescent sheet, whereas the photoluminescent sheet comprises at least a surface comprising a wet preventing layer for minimizing a contracting area between the photoluminescent sheet and another sheet. According to at least one embodiment, wet is not generated on a screen even though the photoluminescent sheet is connected to other sheets.

19 Claims, 5 Drawing Sheets

(51) Int. Cl.
*B32B 5/16* (2006.01)
*C09K 11/02* (2006.01)

(56) References Cited

U.S. PATENT DOCUMENTS

| | | | |
|---|---|---|---|
| 6,064,524 | A | 5/2000 | Oka et al. |
| 6,099,135 | A | 8/2000 | Oda et al. |
| 6,123,431 | A | 9/2000 | Teragaki et al. |
| 6,197,218 | B1 * | 3/2001 | Hampden-Smith et al. ............ 252/301.4 R |
| 6,309,486 | B1 | 10/2001 | Kawaguchi et al. |
| 6,440,587 | B1 | 8/2002 | Jamil et al. |
| 7,009,771 | B2 | 3/2006 | Bourdelais et al. |
| 7,052,152 | B2 | 5/2006 | Harbers et al. |
| 2001/0012159 | A1 * | 8/2001 | Umemoto et al. ............ 359/599 |
| 2001/0046081 | A1 | 11/2001 | Hayashi et al. |
| 2002/0043627 | A1 | 4/2002 | Bergh |
| 2002/0043926 | A1 | 4/2002 | Takahashi et al. |
| 2002/0071948 | A1 | 6/2002 | Duff et al. |
| 2002/0117959 | A1 * | 8/2002 | Winsor ........................ 313/484 |
| 2002/0142133 | A1 | 10/2002 | Matsunaga et al. |
| 2002/0150722 | A1 | 10/2002 | Suzuki |
| 2003/0012008 | A1 | 1/2003 | Chang et al. |
| 2003/0053008 | A1 * | 3/2003 | Nakano ........................ 349/65 |
| 2003/0148088 | A1 | 8/2003 | Padmanabhan et al. |
| 2003/0198738 | A1 | 10/2003 | Tian |
| 2003/0222577 | A1 | 12/2003 | Lu |
| 2004/0012832 | A1 | 1/2004 | Gallen et al. |
| 2004/0120155 | A1 | 6/2004 | Suenaga |
| 2004/0207995 | A1 | 10/2004 | Park et al. |
| 2005/0001225 | A1 * | 1/2005 | Yoshimura et al. ............ 257/98 |
| 2005/0001532 | A1 * | 1/2005 | Srivastava et al. ............ 313/484 |
| 2005/0196545 | A1 | 9/2005 | Ando |
| 2006/0001036 | A1 * | 1/2006 | Jacob et al. .................... 257/98 |
| 2006/0007371 | A1 * | 1/2006 | Miyatake et al. ............ 349/96 |
| 2006/0068154 | A1 | 3/2006 | Parce et al. |
| 2006/0198021 | A1 * | 9/2006 | Fukuda et al. ............ 359/490 |
| 2007/0031685 | A1 | 2/2007 | Ko et al. |

FOREIGN PATENT DOCUMENTS

| | | | |
|---|---|---|---|
| JP | 1998-097201 A | 4/1998 | |
| JP | 2002-323613 | * 8/2002 | ............ G02B 5/128 |
| KR | 2000-0059813 A | 10/2000 | |
| KR | 2002-0068551 A | 8/2002 | |
| KR | 2005-0051037 A | 6/2005 | |
| KR | 2005-0093047 A | 9/2005 | |
| KR | 2005-0107068 A | 11/2005 | |
| WO | WO 2005010431 A1 | * 2/2005 | |

* cited by examiner

PHOTOLUMINESCENT SHEET

CROSS-REFERENCE TO RELATED APPLICATIONS

This application is a continuation of U.S. application Ser. No. 11/716,908, filed Mar. 12, 2007, now U.S. Pat. Ser. No. 7,829,179, issued Nov. 9, 2010, which claims the benefit under 35 U.S.C. §119 of Korean Patent Application No. 10-2006-0022575, filed Mar. 10, 2006, which are hereby incorporated in their entirety.

BACKGROUND OF THE INVENTION

1. Field of the Invention

The present invention is related to a photoluminescent sheet, more specifically to a photoluminescent sheet that has a function for wet preventing.

2. Background Art

A photoluminescent sheet (or film), which is included in a back light unit (BLU) used for a liquid crystal display apparatus, performs light diffusion as well as color conversion by using a photoluminescent operation. This sheet is called a photoluminescent film (PLF) because of the performance of the light conversion caused by the photoluminescent operation. Also, this sheet is called a photoluminescent diffusion sheet (PLDS) because of the performance of the light diffusion.

SUMMARY OF CERTAIN INVENTIVE ASPECTS

One aspect of the present invention provides a photoluminescent sheet by which wet is not generated on a screen even though the photoluminescent sheet is connected to other sheets.

Another aspect of the present invention provides a photoluminescent sheet, which has a phosphor, absorbs some light, of at least one wavelength, of light emitted from a light source, emits particular light of a wavelength different from the wavelength of the emitted light and allows the remaining of the light emitted from the light source to penetrates the photoluminescent sheet, whereas the photoluminescent sheet comprises at least a surface comprising a wet preventing layer for minimizing a contracting area between the photoluminescent sheet and another sheet.

Another aspect of the present invention provides a photoluminescent sheet, which has a phosphor, absorbs some light, of at least one wavelength, of light emitted from a light source, emits particular light of a wavelength different from the wavelength of the emitted light and allows the remaining of the light emitted from the light source to penetrates the photoluminescent sheet, whereas the photoluminescent sheet comprises at least a surface comprising a bend for minimizing a contracting area between the photoluminescent sheet and another sheet.

Another aspect of the present invention provides a photoluminescent sheet, comprising: i) a main body containing a phosphor and comprising two opposing surfaces wherein the main body is configured to 1) absorb light, of at least one wavelength, emitted from a light source, 2) emit light of a wavelength different from the wavelength of the emitted light and 3) allow the remaining of the light emitted from the light source to penetrate the photoluminescent sheet and ii) a wet preventing layer, formed on at least one of the two opposing surfaces of the main body, configured to minimize a contact area between the main body and another sheet.

Still another aspect of the present invention provides a back light unit, comprising: i) a light source configured to emit light and ii) a photoluminescent sheet including a main body and a layer, wherein the main body contains a plurality of phosphor particles and comprising two opposing surfaces, wherein the main body is configured to 1) absorb light, of at least one wavelength, emitted from the light source, 2) emit light of a wavelength different from the wavelength of the emitted light and 3) allow the remaining light to pass through the photoluminescent sheet, wherein the layer is formed on at least one of the two opposing surfaces of the main body, and comprises an uneven surface which contacts neither of the two opposing surfaces of the main body, and wherein the main body has a first thickness and the layer has a second thickness which is substantially less than the first thickness.

BRIEF DESCRIPTION OF THE DRAWINGS

Embodiments of the present invention will be described with regard to accompanying drawings.

DESCRIPTION OF CERTAIN INVENTIVE EMBODIMENTS

Figure 1:
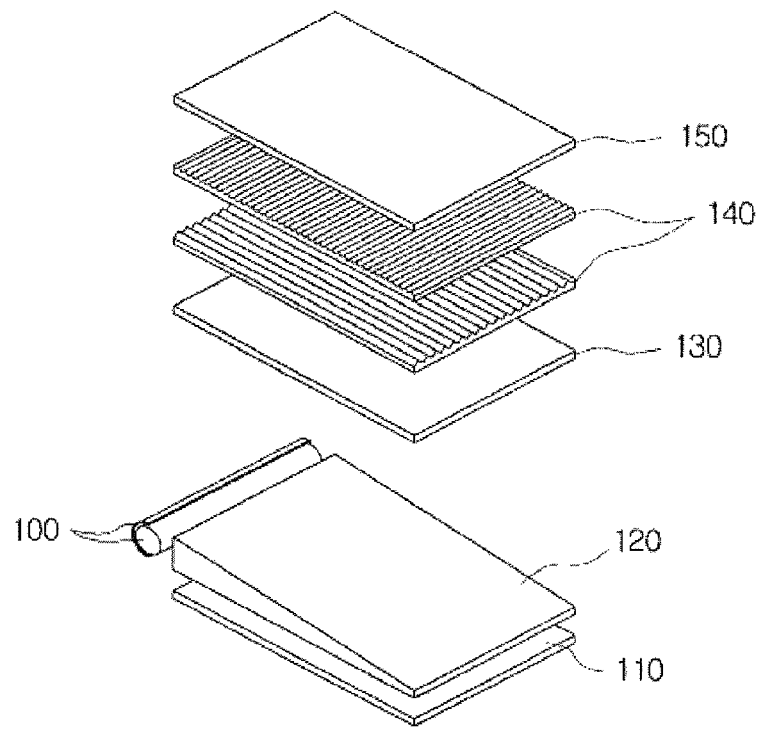
FIG. 1 illustrates a typical back light unit (BLU).

A structure of a back light unit employed for a typical liquid crystal apparatus will be described with reference to FIG. 1. FIG. 1 illustrates a typical back light unit (BLU). As shown in FIG. 1, the BLU used for a liquid crystal display apparatus includes a light source 100, a reflection sheet 110, a light guide sheet 120, a diffusion sheet 130, a prism sheet 140 and a passivation sheet 150.

Light emitted from the light source 100 is transmitted through the light guide sheet 120. The light source 100 can include a reflection plate (not shown) which reflects the light emitted from the light source 100 to the light guide sheet 120 for the improvement of efficiency. The reflection sheet 110 reflects to the light guide sheet 120 again the light, not sent to the light guide sheet 120, among the light that has been emitted from the light source 100 and transmitted to the back of the light guide sheet 120.

The light guide sheet 120 allows light to advance in a particular direction. The diffusion sheet 130 prevents the light, sent from the light guide sheet 120, from being partially gathered by diffusing the light. The prism sheet 140, which is formed by way of a prism having a triangular-column like shape in a regular arrangement on an upper part, gathers the light diffused from the diffusion sheet 130 in a direction vertical to the planar surface of a liquid crystal panel. The prism sheet 140 is generally provided as horizontal and vertical prism sheets 140 to gather the light, which is passed through the diffusion sheet 130 and has low luminescence due to the horizontal and vertical diffusion to the planar surface of the diffusion sheet 140.

The passivation sheet 150, which is provided in a most upper part of the BLU, prevents damage of the below-positioned sheets. The photoluminescent sheet can replace the diffusion sheet of the structure of the BLU to perform not only the color conversion but also the diffusion of the transmitted light, which was performed by the diffusion sheet. Accordingly, the photoluminescent sheet is generally provided in the position where the diffusion sheet was positioned in the structure of BLU. Since the photoluminescent sheet can carry out the functions that the diffusion sheet has performed, a structure for wet preventing of the diffusion sheet will be described with reference to FIG. 2.

Figure 2:
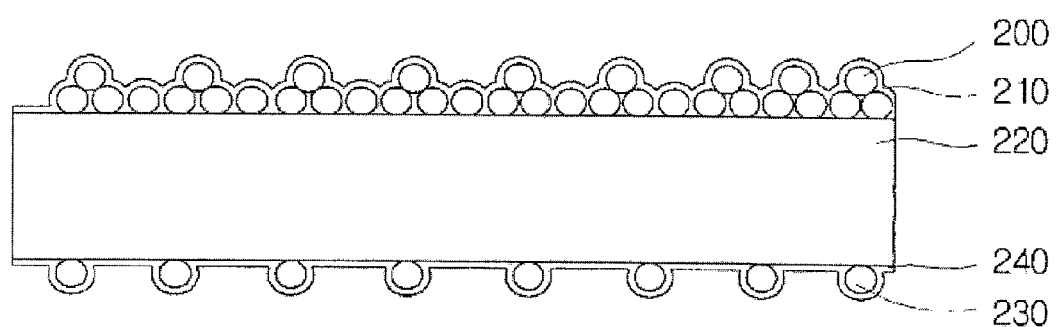
FIG. 2 is a sectional diagram illustrating a section of a typical diffusion sheet for wet preventing.

FIG. 2 is a sectional diagram illustrating a section of the diffusion sheet for the wet preventing. As illustrated in FIG. 2, the sheet for the wet preventing includes a diffusion bead 200, a diffusion bead adhesive layer 210, a base film 220, a wet preventing bead 230 and a wet preventing bead adhesive layer 240.

What is described as "wet" in this description refers to a phenomenon in which an area of an LCD (or other non self-emissive display) screen appears deteriorated or stained when a sheet is improperly contacted with another sheet or exposed to moisture. The diffusion sheet 130 diffuses the light transmitted from the light guide sheet 120 to prevent the light from being partially gathered. The diffusion bead 200 is connected to the base film 220 by the diffusion bead adhesive layer 210 in a surface facing the prism sheet 140.

The base film 220, which is a base of the diffusion sheet 130, is formed of polyethyleneterephthalate (PET). In a surface contacting the light guide sheet 120, the wet preventing bead 230 for preventing the wet caused by the contact with the light guide sheet 120 is connected to the base film 120 by the wet preventing bead adhesive layer.

This diffusion sheet performs only a function, for preventing the sent light from being partially gathered by diffusing the light. Also, the BLU is difficult to reduce a manufacturing cost or make a compact size. To solve this above problem, there has been developed a photoluminescent sheet, not only for performing the diffusion of transmitted light instead of the diffusion sheet but also for allowing its matrix to have fluorescent materials in order to change colors.

However, in spite of these above benefits, since the photoluminescent sheet cannot perform the different functions together at the first time, the photoluminescent sheet is generally connected to other sheets such as the light guide sheet. Accordingly, there has been generated a phenomenon in which an area of an LCD screen appears wet in case that a sheet is improperly contacted with another sheet or exposed to moisture.

Some embodiments of the present invention will be described below with reference to the accompanying drawings, examples of which are illustrated in the accompanying drawings, wherein like reference numerals refer to like elements throughout for the convenience of whole understanding.

Examples of photoluminescent sheets that can have a wet preventing function in accordance with one embodiment of the present invention will be described with reference to FIG. 3 through FIG. 5.

A photoluminescent sheet (or film), which is included in a back light unit (BLU) used for a liquid crystal display apparatus, performs light diffusion as well as color conversion by using a photoluminescent operation.

The photoluminescent sheet, which has a phosphor, absorbs some light, of at least one wavelength, of light emitted from the light source, emits particular light of a wavelength different from the wavelength of the emitted light and allows the remaining of the light emitted from the light source to penetrates the photoluminescent sheet. The photoluminescent sheet further includes a light diffusing agent for light diffusion.

This photoluminescent sheet is designed to solve problems of the difficulty in reducing a manufacturing cost or making a compact size due to a typical BLU having many sheets.

Accordingly, the photoluminescent sheet can further include the light diffusing agent not only to allow its matrix to have a phosphor for color conversion but also to diffuse sent light replacing a typical diffusion sheet.

The matrix can be formed of a silicon resin, and the phosphor is used for the color conversion.

The property of the silicon resin used for the matrix of the photoluminescent sheet according to one embodiment of the present invention can has the light permeability of 85 percent or more and the viscosity of 3000 cps or more. The preferable property of the silicone resin can further be hardened at the temperature of 150°C. or less.

Also, the preferable property of the silicon can have the stable mixture of the phosphor and the light diffusing agent, the low volatilization, the long pot-life and the good adhesion with the base film.

The silicone resin can be made of a resin having a basic structure of $HO(Me)2SiO(Me2SiO)n(Me)2SiOH$ and $Me3SiO(MeHSiO)nSiMe3$ and a small amount of additives of $RSi(OR')n$, $R'$=alkyl or acetyl(=>C=OR) and $R2Sn(OC=OR')2$ or a resin in a basic structure of $CH2=CH(Me)2SiO(Me2SiO)nSi(Me)2CH=CH2$ and $Me3SiO(MeHSiO)nSiMe3$ and a small amount of additives of $[CH2=CH(Me)2SiOSi(Me)2CH=CH2]nPt$.

The phosphor performs a photoluminescent operation. The phosphor can be an inorganic phosphor. The inorganic phosphor can include a phosphor where cerium is doped on a garnet composition material, $Y_3Al_5O_{12}$ (YAG).

More specifically, a yellow phosphor can be one of YAG and TAG composition (Tb3Al5O12) and Silicate composition (Sr2SiO4:Eu). The yellow phosphor can be represented by $(Y_{1-x-y}Gd_xCe_y)_3Al_5O_{12}$ (YAG:Gd, Ce), $(Y_{1-x}Ce_x)_3Al_5O_{12}$ (YAG:Ce), $(Y_{1-x}Ce_x)_3(A_{1 1-y}Ga_y)_5O_{12}$ (YAG:Ga, Ce), $(Y_{1-x-y}Gd_xCe_y)_3(Al_5-zGa_z)_5O_{12}$(YAG:Gd, Ga, Ce) and $(Gd_{1-x}Ce_x)SC_2A_{13}O_{12}$ (GSAG).

The luminescence of $Ce_3+$ depending on the garnet composition can be made with various colors from green (~540 nm; YAG:Ga, Ce) to (~600 nm; YAG:Gd, Ce) without any loss of light efficiency.

A red phosphor for emitting dark red color light can be one of CaS:Eu, SrS:Eu and SrB4O7:Sm. A representative inorganic phosphor can be $SrB_4O_7:Sm_2+$. The $Sm_2+$ is mainly used for a red wavelength.

The dark red inorganic phosphor absorbs whole visible light wavelength range of 600 nm or less and emits the dark red color light of 650 nm or over.

A representative inorganic green phosphor for emitting green color light can be $SrGa_2S4:Eu_2+$. The green inorganic phosphor absorbs light of 500 nm or less and emits light of a main wavelength of 535 nm.

A representative inorganic phosphor for emitting blue color light can be $BaMg_2A_{116}O_{27}:Eu_2+$. The blue inorganic phosphor absorbs light of 430 nm or less and emits light of a main wavelength of 450 nm.

The phosphor can have a size of 5 to 30 μm. Too small size of the phosphor causes low photoluminescent efficiency, and too large size causes low light permeability and low uniformity of thin film.

The light diffusing agent uniformly scatters light to diffuse the light.

The light diffusing agent can be a polymer compound or an inorganic compound.

The polymer compound can be a transparent organic polymer compound such as an acryl resin, a styrene resin and a silicone resin or a transparent inorganic compound such as synthetic silica, glass bead and diamond.

Also, the inorganic compound can be silicon dioxide ($SiO_2$), titanium (IV) oxide ($TiO_2$), zinc oxide (ZnO), barium sulfate ($BASO_4$), calcium sulfate ($CaSO_4$), magnesium carbonate ($MgCO_3$), aluminum hydroxide ($Al(OH)_3$) or clay.

The diffusion of light emitted from the light source is adjusted depending on the size and concentration of the light diffusing agent. The too small size causes low light diffusion efficiency, and the too strong concentration causes low light permeability.

Based on silicon dioxide ($SiO_2$), the light diffusing agent can have the size of 3 to 20 μm and the concentration of 1 to 15%.

The photoluminescent sheet can be a thin film formed by applying the mixture of the phosphor and/or the light diffusing agent to a resin, which is a material of a sheet for performing another function.

The photoluminescent sheet can be formed on the resin that is the material of the sheet for performing another function by various methods such as a screen printing method, a gravure printing method, a knife coating method, a reverse roll coating method, a roll coating method, a calendar coating method, a curtain coating method, an extrusion coating method, a cast coating method, an inverted rod coating method, an engraved-roll coating method, a dip coating method and a slit coating method.

When being directly coated in the light guide sheet, coupled to a photoluminescent diffusion sheet, the photoluminescent diffusion sheet can formed by using the screen printing method.

Examples of the photoluminescent sheet, having the above structures and manufacturing methods according to one embodiment of the present invention will be described with reference to FIG. 3 through FIG. 5.

Figure 3:
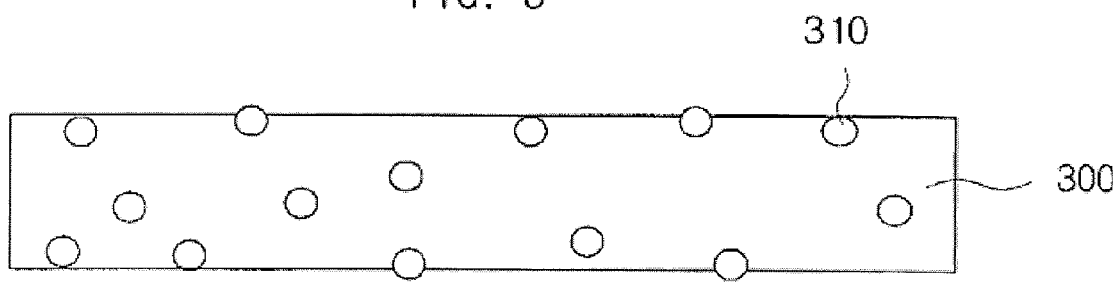
FIG. 3 is a sectional diagram illustrating a section of a first kind of a photoluminescent sheet according to one embodiment of the present invention.
Figure 4:
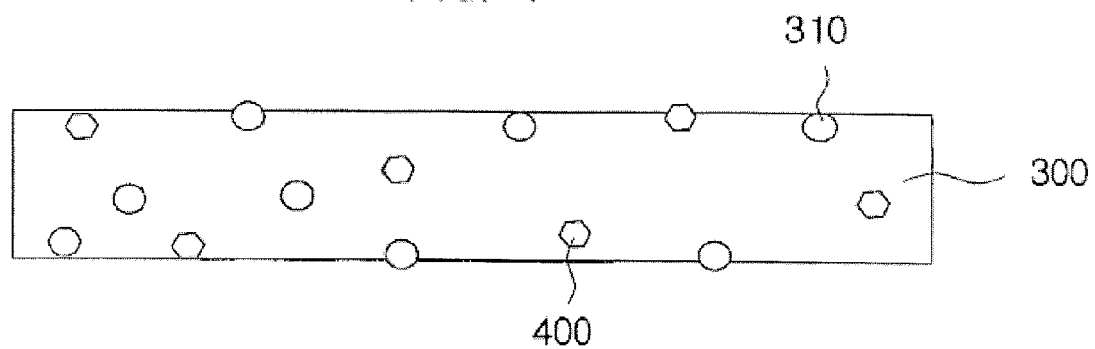
FIG. 4 is a sectional diagram illustrating a section of a second kind of a photoluminescent sheet according to one embodiment of the present invention.

FIG. 3 is a sectional diagram illustrating a section of a first kind of the photoluminescent sheet according to one embodiment of the present invention, and FIG. 4 is a sectional diagram illustrating a section of a second kind of the photoluminescent sheet according to one embodiment of the present invention. FIG. 5 is a sectional diagram illustrating a section of a third kind of the photoluminescent sheet according to one embodiment of the present invention.

FIG. 3 is related to the first kind of the photoluminescent sheet according to one embodiment of the present invention. A matrix 300 has a yellow phosphor 310 only.

FIG. 4 is related to the second kind of the photoluminescent sheet according to one embodiment of the present invention and illustrates the section of the matrix 300 of the photoluminescent sheet, the matrix 300 having the yellow phosphor 310 in FIG. 3 further having a light diffusing agent 400.

The photoluminescent sheet can perform a light diffusing function that was performed by a typical diffusion sheet by having the light diffusing agent 400.

Figure 5:
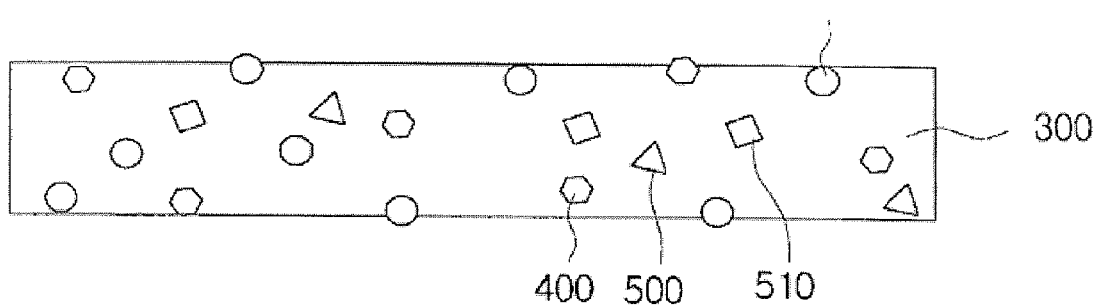
FIG. 5 is a sectional diagram illustrating a section of a third kind of a photoluminescent sheet according to one embodiment of the present invention.

FIG. 5 is related to the third kind of the photoluminescent sheet according to one embodiment of the present invention and illustrates the section of the matrix 300 of the photoluminescent sheet, the matrix 300 further having a red phosphor 500 and a green phosphor 510 as well as the yellow phosphor 310 and the light diffusing agent 400.

In one embodiment, a passivation film can selectively be laminated to the photoluminescent sheet.

In one embodiment, to avoid an effect of the foreign elements, the passivation film can be laminated by using a silicone resin having an adhesive force after its matrix is hardened.

In addition, the photoluminescent sheet can be directly formed in the light guide sheet of the BLU by the screen printing method.

The photoluminescent sheets illustrated in FIG. 3 through FIG. 5 are examples only. It shall be evident that the present invention can be applied to other photoluminescent sheets, which are not shown in FIG. 3 through FIG. 5.

Hereinafter, a photoluminescent sheet that has a function for wet preventing according to one embodiment of the present invention will be described with reference to a structure and efficiency of the photoluminescent sheet.

Although the photoluminescent sheet that has the function for wet preventing can be embodied with the above-described various kinds of the photoluminescent sheets, executable embodiments will be described below with reference to the photoluminescent sheet having the yellow phosphor, the red phosphor, the green phosphor and a light diffusing agent, which has been described in FIG. 5.

The method of applying the wet protecting function to the photoluminescent sheet has a method of attaching a wet preventing bead on a surface of the photoluminescent sheet and another method of forming a bend on the surface of the photoluminescent sheet to minimize a contacting area between the sheets when the photoluminescent sheet is connected to another sheet.

Certain embodiments of the photoluminescent sheets having the function for wet preventing, based on the above methods will be described.

A wet preventing bead is connected to at least a surface of the photoluminescent sheet by a wet preventing bead adhesive layer. The wet preventing bead and the wet preventing bead adhesive layer forms a wet preventing layer.

Some executable embodiments based on the wet preventing by attaching the wet preventing bead on at least a surface of the photoluminescent sheet will be described below.

Figure 6:
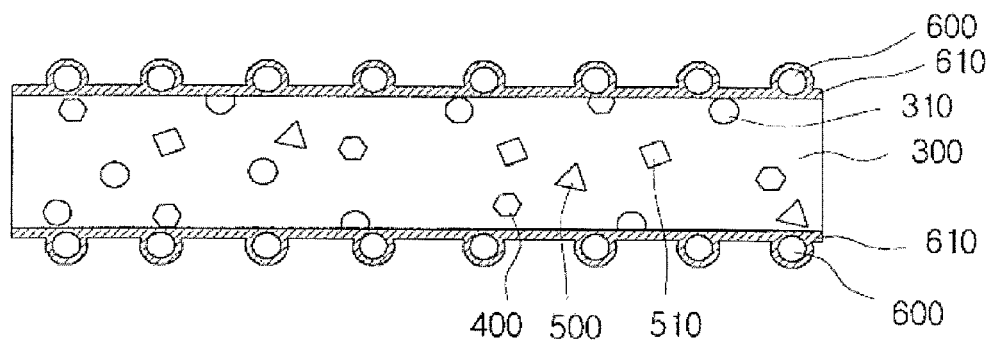
FIG. 6 is a sectional diagram illustrating a section of a photoluminescent sheet having a wet preventing function in accordance with a first embodiment of the present invention.

FIG. 6 is a sectional diagram illustrating the section of the photoluminescent sheet having the wet preventing function in accordance with a first embodiment of the present invention.

As illustrated in FIG. 6, the photoluminescent sheet having the wet preventing function in accordance with the first embodiment of the present invention can include a wet preventing bead 600 and a wet preventing bead adhesive layer 610, which are provided on both surfaces of the photoluminescent sheet.

The wet preventing bead can have a sphere shape, which is formed of a transparent inorganic material or a polymer resin.

The transparent inorganic material can be one of $SiO_2$ and $TiO_2$. The polymer resin can be one of polymethylmethacrylate (PMMA), polystyrene (PS) and polycarbonate (PC).

The wet preventing bead can be formed of the same material as the light diffusing agent 400 included in the photoluminescent sheet.

The wet preventing bead 600 can have sphere shapes of various sizes. Generally, the size of 1 to 90 μm is commonly used. The size can be 3 to 30 μm.

The wet preventing bead 600 can be connected to the wet preventing bead adhesive layer 610, formed of a plastic resin, to be attached on the photoluminescent sheet.

A thermoplastic resin or a thermosetting resin is possible. Specifically, the plastic resin can be a polyester resin, an acrylic resin, an epoxy resin and a silicone resin. The plastic resin can be a polyester resin.

The wet preventing bead adhesive layer 610 can have various depths or the depth of 1 to 5 μm.

The structure of the wetpreventing bead 600 and the wet preventing bead adhesive layer 610, in case that the wet preventing bead 600 is applied to the photoluminescent sheet to have the wet preventing function, can be commonly used.

Accordingly, in the case of including the wet preventing bead 600, the description for the structure of the wet preventing bead 600 and the wet preventing bead adhesive layer 610 will be omitted in other embodiments.

Figure 7:
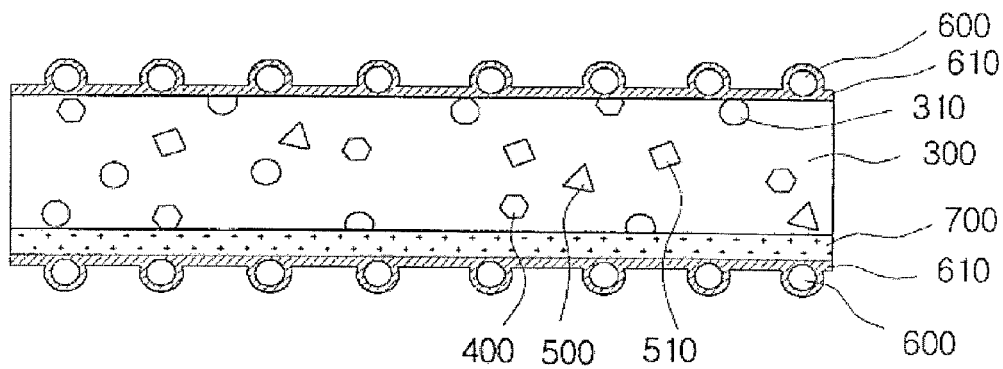
FIG. 7 is a sectional diagram illustrating a section of a photoluminescent sheet having a wet preventing function in accordance with a second embodiment of the present invention.

FIG. 7 is a sectional diagram illustrating a section of the photoluminescent sheet having the wet preventing function in accordance with a second embodiment of the present invention.

As described above, a passivation film 700 can selectively be laminated to the photoluminescent sheet. To avoid an effect of the foreign elements, the passivation film 700 can be laminated by using a silicone resin having adhesive force after it matrix is hardened.

FIG. 7 illustrates the section of the photoluminescent sheet having the wet preventing function in case that the passivation film 700 is selectively laminated.

FIG. 7 shows an example that a surface of the photoluminescent sheet and the passivation film 700, respectively, has the wet preventing layer in case that the passivation film 700 is selectively laminated to at least a surface of the photoluminescent sheet.

Although FIG. 7 shows that the surface of the photoluminescent sheet and the surface of the passivation film 700 have the wet preventing layers, it shall be evident that any one only of the surfaces of the photoluminescent sheet and the surface of the passivation film 700 has the wet preventing layer.

This structure, including the passivation film 700 laminated to the photoluminescent sheet, can protect the photoluminescent sheet.

The wet preventing layer can be located at a position, which is determined depending on a direction of connecting the photoluminescent sheet, having the passivation film 700 laminated thereto, and other sheets for performing different functions.

For example, in case other sheets for different functions are not connected to one surface, where the passivation film 700 is laminated, the wet preventing layer can be connected to the other surface only, where the passivation film 700 is not laminated.

Conversely, in case other sheets for different functions are further connected to the surface, where the passivation film 700 is laminated, the wet preventing layer can be connected to the surface only where the passivation film 700 is laminated.

Since the structure and function of this wet preventing layer having the wet preventing bead 600 and the wet preventing bead adhesive layer 610 is the same as the structure and function described in FIG. 6, the description for the wet preventing layer will be omitted.

Figure 8:
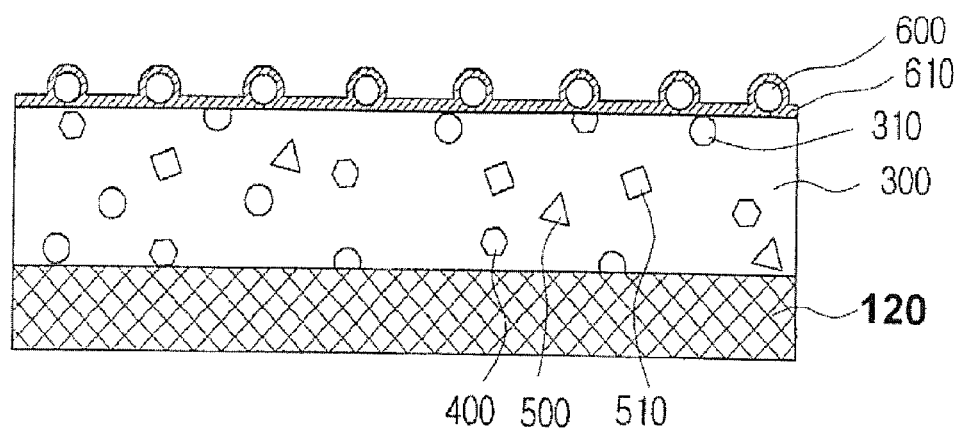
FIG. 8 is a sectional diagram illustrating a section of a photoluminescent sheet having a wet preventing function in accordance with a third embodiment of the present invention.

FIG. 8 is a sectional diagram illustrating the section of the photoluminescent sheet having the wet preventing function in accordance with a third embodiment of the present invention.

FIG. 8 illustrates the section of the wet preventing photoluminescent sheet in case the photoluminescent sheet according to one embodiment of the present invention is directly connected to the light guide sheet 120.

Since the photoluminescent sheet having the wet preventing function according to one embodiment of the present invention can be realized by various doping methods as described above, the photoluminescent sheet can be directly connected to the light guide sheet 120.

In this case, as illustrated in FIG. 8, the photoluminescent sheet according to one embodiment of the present invention can be formed by doping one surface of the photoluminescent sheet on the light guide sheet 120. Then, the wet preventing layer can be formed on the other surface of the photoluminescent sheet to perform the wet preventing function.

Figure 9:
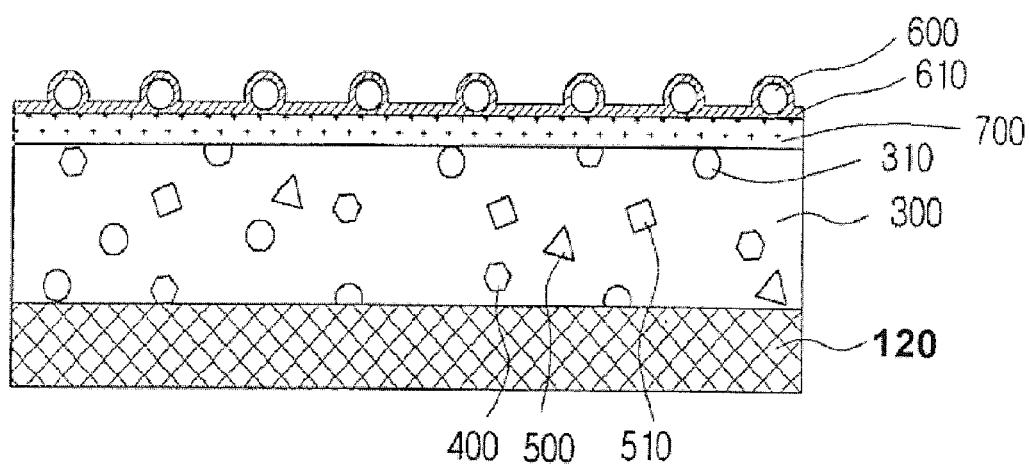
FIG. 9 is a sectional diagram illustrating a section of a photoluminescent sheet having a wet preventing function in accordance with a fourth embodiment of the present invention.

FIG. 9 is a sectional diagram illustrating a section of the photoluminescent sheet having the wet preventing function in accordance with a fourth embodiment of the present invention.

FIG. 9 illustrates the section of the photoluminescent sheet having the wet preventing function in case the photoluminescent sheet according to one embodiment of the present invention is directly connected to the light guide sheet 130 and the passivation film 700 is laminated to the photoluminescent sheet.

As described above, since the passivation film 700 can be laminated to the photoluminescent according to one embodiment of the present invention, FIG. 9 shows that the wet preventing layer is formed on a side part of the laminated passivation film 700.

Figure 10:
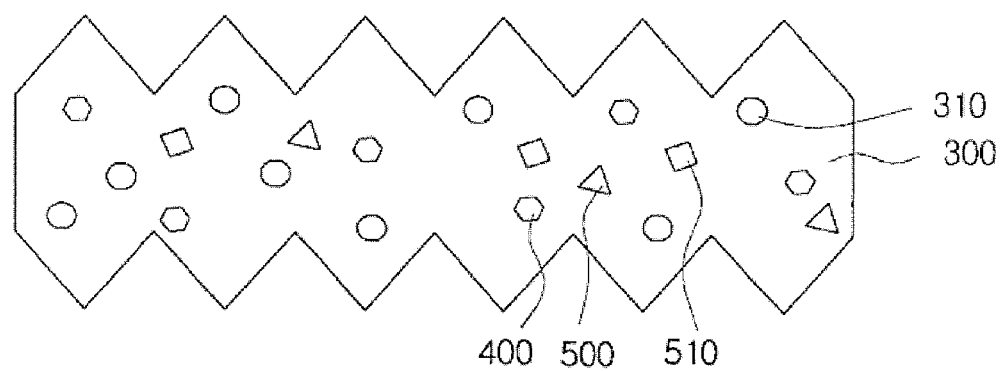
FIG. 10 is a sectional diagram illustrating a section of a photoluminescent sheet having a wet preventing function in accordance with a fifth embodiment of the present invention.

FIG. 10 is a sectional diagram illustrating a section of the photoluminescent sheet having the wet preventing function in accordance with a fifth embodiment of the present invention.

As illustrated in FIG. 10, a bend is formed on the section of the wet preventing photoluminescent sheet in accordance with the fifth embodiment of the present invention.

The bend of the photoluminescent sheet is formed in the matrix of the photoluminescent sheet. One of the two opposing surfaces of the main body has a roughness surface, and the roughness surface includes a sawtooth wave shape.

The contacting area between the sheets, when the photoluminescent sheet is connected to another sheet, minimized thanks to the bend formed on the photoluminescent sheet can remove a phenomenon in which an area of a screen appears wet in case that the sheets are improperly contacted with each other or exposed to moisture.

Figure 11:
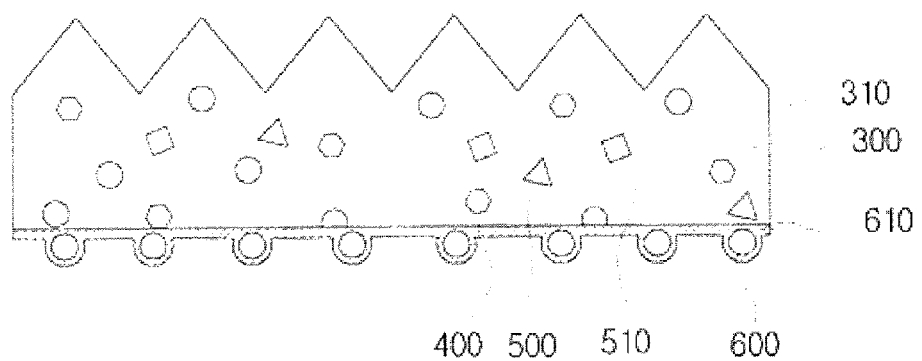
FIG. 11 is a sectional diagram illustrating a section of a photoluminescent sheet having a wet preventing function in accordance with a sixth embodiment of the present invention.

Also, as illustrated in FIG. 11, it is possible that there is realized the photoluminescent sheet having the wet preventing function applied by each of the bend and the wet preventing layer formed on a surface of the photoluminescent sheet. The bend substantially has a sawtooth wave shape on a surface of the photolumininescent sheet.

FIG. 11, which shows the above case, is a sectional diagram illustrating a section of the photoluminescent sheet having the wet preventing function in accordance with a sixth embodiment of the present invention.

As illustrated in FIG. 11, for the section of the photoluminescent sheet having the wet preventing function in accordance with the sixth embodiment of the present invention, the bend is formed on one surface of the photoluminescent sheet and the wet preventing layer having the wet preventing bead and the wet preventing adhesive layer is formed on the other surface, thereby being capable of preventing the wet.

In this case, if both surfaces of the photoluminescent sheet are connected to other sheets for performing different functions, the both surfaces are capable of preventing the wet.

Figure 12:
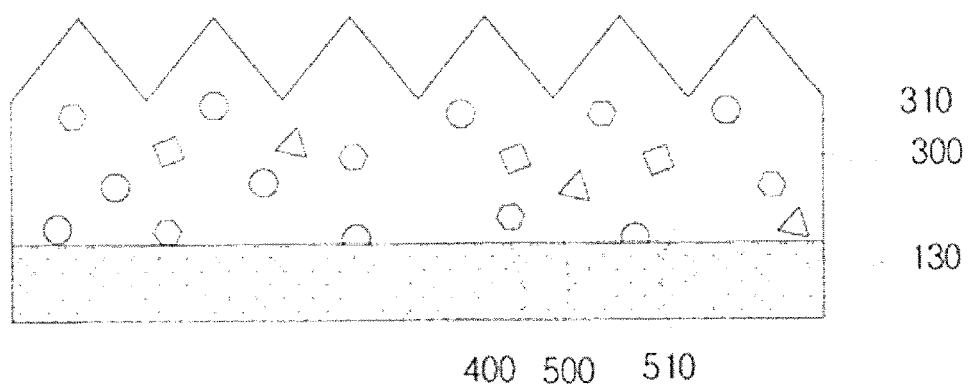
FIG. 12 is a sectional diagram illustrating a section of a photoluminescent sheet having a wet preventing function in accordance with a seventh embodiment of the present invention.

As illustrated in FIG. 12, in case that the photoluminescent sheet is formed by directly doping the photoluminescent sheet on the light guide sheet, it is also possible that a surface, which is not contacted with the light guide sheet, is formed with the bend to perform the wet preventing function.

FIG. 12 is a sectional diagram illustrating a section of the photoluminescent sheet having the wet preventing function in accordance with a seventh embodiment of the present invention.

As illustrated in FIG. 12, for the section of the photoluminescent sheet having the wet preventing function in accordance with the seventh embodiment of the present invention, the bend is formed on one surface of the photoluminescent sheet and the other surface is directly connected to the light guide sheet, thereby being capable of preventing the wet.

The above photoluminescent sheets having the wet preventing functions are only examples of describing the present invention. Alternatively, the present invention can be applied to all kinds of photoluminescent sheets, which includes the phosphors and/or the light diffusing agents, formed with the wet preventing layer and/or the bend for minimizing the contacting area.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A photoluminescent sheet, comprising:
    a body containing a phosphor and a light diffusing agent configured to diffuse incoming light and comprising two opposing surfaces, wherein the body is configured to 1) absorb light, of at least one wavelength, emitted from a light source, 2) emit light of a wavelength different from the wavelength of the emitted light and 3) allow the remainder of the light emitted from the light source to penetrate the photoluminescent sheet; and
    a layer directly contacted with at least one of the two opposing surfaces of the body,
    wherein the layer comprises a bead and an adhesive layer for attaching the bead to the body,
    wherein the adhesive layer comprises a first portion and a second portion,
    wherein a radius of the bead is greater than a thickness of the first portion of the adhesive layer,
    wherein one of the two opposing surfaces of the body has a roughness surface having a sawtooth wave shape for providing a minimized contacting surface, and
    wherein the second portion of the adhesive layer surrounds an entire surface of the bead.

2. The photoluminescent sheet of claim 1, wherein the bead has a diameter between about 3 μm and about 30 μm.

3. The photoluminescent sheet of claim 1, wherein the bead is formed of one of the following: polymethylmethacrylate (PMMA), polystyrene (PS), polycarbonate (PC), silicon dioxide ($SiO_2$), titanium (IV) oxide ($TiO_2$), a transparent inorganic material, or a polymer resin, and the adhesive layer is formed of one of a plastic resin, a polyester resin, an acrylic resin, an epoxy resin or a silicone resin.

4. The photoluminescent sheet of claim 1, wherein the light diffusing agent is formed of one of the following: a polymer compound, an inorganic compound, an acrylic resin, a styrene resin, a silicone resin, synthetic silica, glass bead, diamond, silicon dioxide (SiO2), titanium (IV) oxide ($TiO_2$), zinc oxide (ZnO), barium sulfate ($BASO_4$), calcium sulfate ($CaSO_4$), magnesium carbonate ($MgCO_3$) or aluminum hydroxide ($Al(OH)_3$).

5. The photoluminescent sheet of claim 1, wherein the light diffusing agent comprises a plurality of spherical particles, and wherein each of the plurality of particles has a diameter between about 3 μm and 20 μm.

6. The photoluminescent sheet of claim 1, wherein the phosphor comprises at least one of a yellow phosphor, a red phosphor or a green phosphor.

7. The photoluminescent sheet of claim 1, wherein the body comprises a silicone resin.

8. The photoluminescent sheet of claim 7, wherein the silicone resin has the light permeability of about 85 percent or more, a viscosity of about 3000 cps or more and a hardening temperature of about 150° C. or less.

9. The photoluminescent sheet of claim 1, wherein the photoluminescent sheet is connected to a light guide sheet.

10. A photoluminescent sheet, comprising:
    a body containing a phosphor and a light diffusing agent configured to diffuse incoming light and comprising two opposing surfaces, wherein the body is configured to 1) absorb light, of at least one wavelength, emitted from a light source, 2) emit light of a wavelength different from the wavelength of the emitted light and 3) allow the remainder of the light emitted from the light source to penetrate the photoluminescent sheet; and
    wherein one of the two opposing surfaces of the body has a first portion and the other of the two opposing surfaces of the body has a second portion,
    wherein each of the first portion and second portion has a sawtooth wave shape for providing a minimized contacting surface,
    wherein apexes of the first portion are formed on a first horizontal plane and apexes of the second portion are formed on a second horizontal plane, and
    wherein the first horizontal plane is parallel to the second horizontal plane.

11. The photoluminescent sheet of claim 10, wherein the light diffusing agent is formed of one of the following: a polymer compound, an inorganic compound, an acrylic resin, a styrene resin, a silicone resin, a synthetic silica, a glass bead, a diamond, silicon dioxide (SiO2), titanium (IV) oxide ($TiO_2$), zinc oxide (ZnO), barium sulfate ($BASO_4$), calcium sulfate ($CaSO_4$), magnesium carbonate ($MgCO_3$), or aluminum hydroxide ($Al(OH)_3$).

12. The photoluminescent sheet of claim 10, wherein the light diffusing agent comprises a plurality of spherical particles, and wherein each of the plurality of particles has a diameter between about 3 μm and about 20 μm.

13. The photoluminescent sheet of claim 10, wherein the body comprises a silicone resin.

14. The photoluminescent sheet of claim 13, wherein the silicone resin has a light permeability of about 85 percent or more, a viscosity of about 3000 cps or more, and a hardening temperature of about 150° C. or less.

15. The photoluminescent sheet of claim 10, wherein the photoluminescent sheet is connected to a light guide sheet.

16. The photoluminescent sheet of claim 10, wherein the phosphor is an inorganic phosphor and wherein the inorganic phosphor is form by doping cerium on a garnet composition material, $Y_3Al_5O_{12}$ (YAG).

17. The photoluminescent sheet of claim 10, wherein the phosphor comprises at least one of a yellow phosphor, a red phosphor, or a green phosphor.

18. The photoluminescent sheet of claim 17, wherein the yellow phosphor is one of a YAG and TAG composition ($Tb_3Al_5O_{12}$) or a silicate composition ($Sr_2SiO_4$:Eu).

19. The photoluminescent sheet of claim 1, wherein the bead is not in contact with the body.

\* \* \* \* \*